Jan. 14, 1930.      L. F. MEUNIER      1,743,860
ELECTRIC TOOL
Filed July 26, 1926
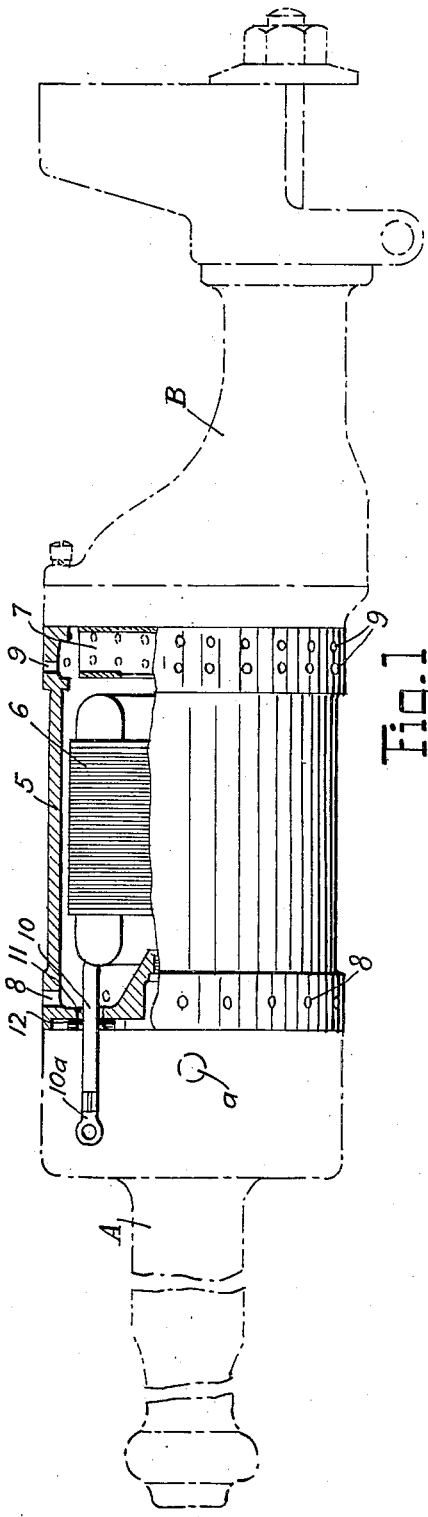
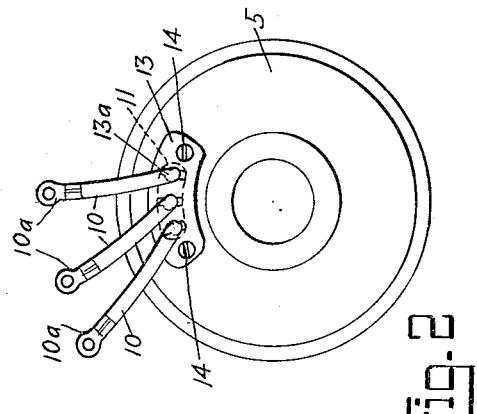
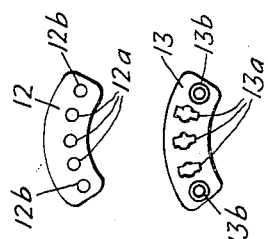
INVENTOR.
Leon F. Meunier
BY
Ira L. Nickerson
ATTORNEY.

Patented Jan. 14, 1930

1,743,860

UNITED STATES PATENT OFFICE

LEON F. MEUNIER, OF CLEVELAND, OHIO, ASSIGNOR TO CHICAGO PNEUMATIC TOOL COMPANY, OF NEW YORK, N. Y., A CORPORATION OF NEW JERSEY

ELECTRIC TOOL

Application filed July 26, 1926. Serial No. 124,832.

This invention relates to electrical motors provided with air cooling means and particularly concerns the protection of delicate mechanism such as the control device from the dust, abrasives, and other material drawn into the motor casing with the air.

In the usual type of air cooled motor ventilating holes or openings are provided in the motor housing and air is drawn into the housing by a fan for cooling purposes with the result that the interior of the housing is frequently coated with dust and other foreign matter. When a switch or other delicate mechanism is located adjacent the motor housing, as in a separate compartment, it is desirable to exclude the dust and grit. This presents no particular difficulties except in cases where production reasons make it necessary or highly desirable to assemble terminals upon the power leads of the motor before the latter is placed in its housing.

One object of the invention is to provide simple, efficient, and easily applied means for sealing an opening for one or more power conductors, particularly when the conductors have enlarged terminals. Other objects will be apparent from the detailed description which follows.

In order to illustrate the invention one concrete embodiment therof is shown in the accompanying drawings in which:

Fig. 1 is a side elevational view of an electric motor with the housing partly cut away and diagrammatically indicating additional parts forming a portable tool;

Fig. 2 is a left end elevational view of the motor housing shown in Fig. 1; and

Figs. 3 and 4 are plan views of the elements for sealing the opening for the power leads of the motor.

The embodiment of the invention chosen for the purpose of illustration comprises a housing 5 enclosing an electric motor 6 arranged to be cooled through the action of fan 7 which circulates air through the housing, the air being drawn in through inlet openings 8 and discharged through outlet openings 9. The power leads 10 of the motor extend through an opening 11 therefor in the motor casing for connection to a power source preferably through suitable control switch mechanism (not shown).

The motor and its housing may form the power element of a portable tool, such as an electric drill or a grinder. In the present instance the switch handle A with its plunger $a$ and the front head B of a grinder are diagrammatically indicated. Since air is continually being circulated through the motor housing 5, the interior of the housing soon becomes coated with dust, abrasives and other material which may be floating in the air. It is common practice to provide efficient means for preventing this dust and grit from finding its way into the motor bearings and into the gear case. It is equally important to prevent it from reaching other and more delicate mechanisms, such as the control switch apparatus, which is usually disposed in a compartment adjacent the motor housing as in switch handle A.

Since it is usually necessary or very desirable from a production standpoint to apply connecting terminals to the power leads to the motor before the latter is mounted in its housing, some little difficulty has been experienced in devising effective sealing means, for the opening 11 in the motor housing for the power leads, which are inexpensive to manufacture and apply. The present invention relates directly to sealing means for opening 11 for the power leads. Incidentally increased protection against "shorts" is attained by spacing and insulating the leads. To this end a gasket 12 of gum rubber or other suitable elastic material is provided of a size to cover opening 11 and having relatively small holes $12^a$ therethrough for leads 10, also additional holes $12^b$ if desired for fastening means (Fig. 4). Since this gasket is readily extensible the terminals $10^a$ may be passed through opening $12^a$ by distorting the gasket whereupon the leads 10 will be tightly gripped with a sealing contact in the holes $12^a$. Suitable means are then provided for securing the gasket 12 to the motor housing over the opening 11 so as to effectively close and seal the same. One means for this purpose may comprise a clamping plate 13 of relatively stiff and rigid material which may be metal but is preferably of dielectric material, such as fiber or so-called "fish paper". Plate 13 has openings 13ª so disposed as to register with the holes 12ª of gasket 12 but the openings 13ª are relatively larger and of a size and shape freely to pass the terminals 10ª of the leads (Fig. 3). Plate 13 may also have additional holes 13ᵇ to register with holes 12ᵇ for the passage of suitable retaining or securing means such as screws (Fig. 2).

From the above it will be apparent that the present invention provides for the convenient sealing of power leads having enlarged terminals in an opening for the same, that the elements actually used for spacing and sealing the leads are simple and inexpensive to manufacture, that the assembling of the spacing and sealing elements is easily and quickily accomplished by reason of the elastic material of which gasket 12 is formed and by reason of the enlarged openings 13ª in the rigid clamping plate 13, and that when the sealing and spacing elements are in place there is no possibility of the passage of foreign material through the opening in the housing nor of damage to or short circuiting of the leads at this point.

While a preferred form of the invention has been herein shown and described it is to be understood that the invention is not limited to the specific details thereof but covers all changes, modifications and adaptations within the scope of the appended claims.

I claim as my invention:

1. In combination, a member having an opening therethrough, a power conductor having an enlarged end arranged to extend through said opening, and means for sealing said opening when said conductor extends therethrough comprising an element arranged to be passed over the enlarged end of the conductor by distortion of the element and closely to engage said conductor, and a clamping member slidable on said conductor for removably securing said element to said member.

2. In combination, a member having an opening therethrough, a power conductor having an enlarged end arranged to extend through said opening, and means for sealing said opening when said conductor extends therethrough comprising an element arranged to be passed over the enlarged end of the conductor by distortion of the element and closely to engage said conductor, and a substantially rigid element passed over said enlarged end without distortion for clamping said first element against said member.

3. In combination, a motor housing having an opening therethrough, power leads with eyeletted ends arranged to pass through said opening and means to seal said opening with said leads extending therethrough comprising a gasket having small holes therethrough for said leads, said element being of elastic material to enable said eyeletted ends to be passed therethrough by temporarily distorting said gasket, and a relatively rigid member engaging said gasket and securing the same to said housing over said opening.

4. In combination, a motor housing having an opening therethrough, power leads with eyeletted ends arranged to pass through said opening, and means to seal said opening with said leads extending therethrough comprising a rubber gasket having small holes therethrough for said leads but capable of having said eyeletted ends passed therethrough by temporarily distorting said gasket, and a member in face engagement with said gasket for securing the same to said housing over said opening.

5. In combination, a motor housing having an opening therethrough, power leads with eyeletted ends arranged to pass through said opening, and means to seal said opening with said leads extending therethrough comprising a gasket of elastic material having small holes therethrough for said leads, and a rigid member passed over said leads without distortion for clamping said gasket to said housing over said opening.

6. In combination, an electric motor, a housing therefor, having an opening, power leads for said motor having eyeletted ends extending through said opening, and means sealing said opening comprising a rubber gasket having small holes therethrough of a size closely to fit said leads but permitting said eyeletted ends to pass therethrough on distortion of said gasket, and a plate of rigid material having holes of a size to take said eyeletted ends for clamping said gasket to said housing over said opening.

7. In combination, a member having an opening therethrough, a plurality of power conductors extending through said opening, and means sealing said opening and said conductors therein comprising a gasket of elastic material of a size to cover said opening and having small holes therethrough in which said conductors are closely received, and a clamping member securing said gasket in place over the opening in said first named member.

8. Combined spacing and sealing members for power leads with attached terminals comprising a gasket of elastic material having small holes therethrough closely to fit the leads and a clamping plate of relatively stiff material having holes therethrough of a size and shape to take the terminals of the leads.

9. Combined spacing and sealing members for power leads with attached terminals comprising a gasket of elastic material having small holes therethrough closely to fit the leads and a clamping plate of stiff dielectric material having holes therethrough of a size and shape to take the terminals of the leads.

10. Combined spacing and sealing members for power leads having eyeletted terminals comprising a gasket of gum rubber with small holes for tightly fitting the leads, and a clamping plate of fish paper having notched holes of a size to take the eyeletted terminals of the leads.

Signed by me at Cleveland, in the county of Cuyahoga, and State of Ohio this 22nd day of July, 1926.

LEON F. MEUNIER.